(12) United States Patent
Higa

(10) Patent No.: US 11,906,441 B2
(45) Date of Patent: Feb. 20, 2024

(54) INSPECTION APPARATUS, CONTROL METHOD, AND PROGRAM

(71) Applicant: NEC Corporation, Tokyo (JP)

(72) Inventor: Kyota Higa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 153 days.

(21) Appl. No.: 17/615,910

(22) PCT Filed: Jun. 3, 2019

(86) PCT No.: PCT/JP2019/022037
§ 371 (c)(1),
(2) Date: Dec. 2, 2021

(87) PCT Pub. No.: WO2020/245889
PCT Pub. Date: Dec. 10, 2020

(65) Prior Publication Data
US 2022/0317055 A1     Oct. 6, 2022

(51) Int. Cl.
*G01N 21/88*     (2006.01)
*G06T 7/168*    (2017.01)
*G06T 3/00*     (2006.01)

(52) U.S. Cl.
CPC .......... *G01N 21/8851* (2013.01); *G06T 3/00* (2013.01); *G06T 7/168* (2017.01); *G01N 2021/8887* (2013.01); *G06T 2207/20081* (2013.01)

(58) Field of Classification Search
None
See application file for complete search history.

(56) References Cited

U.S. PATENT DOCUMENTS

2003/0053713 A1*  3/2003  Romanik ............. G06T 7/0004
                                              382/284
2015/0355102 A1* 12/2015  Kido ..................... G06T 7/0004
                                              348/46
(Continued)

FOREIGN PATENT DOCUMENTS

CN       106683075 A    5/2017
JP       2000-028540 A  1/2000
(Continued)

OTHER PUBLICATIONS

Lin et al. "Automated defect inspection of LED chip using deep convolutional neural network," Journal of Intelligent Manufacturing (2019) 30:2525-2534, published online Mar. 29, 2018 (Year: 2018).*
(Continued)

*Primary Examiner* — Soo Shin

(57) ABSTRACT

An inspection apparatus (100) detects an inspection object (90) from first image data (10) in which the inspection object (90) is included. The inspection apparatus (100) generates second image data (20) by performing a geometric transform on the first image data (10) in such a way that a view of the detected inspection object (90) becomes a view satisfying a predetermined reference. In an inference phase, the inspection apparatus (100) detects, by using an identification model for detecting an abnormality of the inspection object (90), an abnormality of the inspection object (90) included in the second image data (20). Further, in a learning phase, the inspection apparatus (100) learns, by using the second image data (20), an identification model for detecting an abnormality of the inspection object (90).

20 Claims, 17 Drawing Sheets

(56) References Cited

U.S. PATENT DOCUMENTS

2019/0258225 A1* 8/2019 Link ................. G05B 19/4097
2021/0270755 A1* 9/2021 De Beenhouwer ..... G06T 7/001
2021/0390676 A1* 12/2021 Floeder ................. G06T 7/337

FOREIGN PATENT DOCUMENTS

JP          2018-074757 A    5/2018
KR          10-1782366 B1    9/2017

OTHER PUBLICATIONS

International Search Report for PCT Application No. PCT/JP2019/022037, dated Jul. 30, 2019.

* cited by examiner

FIG. 13

```
IMAGE NUMBER, SCORE,
RECTANGLE AREA COORDINATES (x1, y1, x2, y2, x3, y3, x4, y4)
-------------------------------------------
1, 0.92, 100, 100, 200, 100, 200, 200, 100, 200
4, 0.85, 50, 50, 150, 50, 150, 100, 50, 100
 :
```

INSPECTION APPARATUS, CONTROL METHOD, AND PROGRAM

This application is a National Stage Entry of PCT/JP2019/022037 filed on Jun. 3, 2019, the contents of all of which are incorporated herein by reference, in their entirety.

TECHNICAL FIELD

The present invention relates to an inspection of a structure and the like.

BACKGROUND ART

As working population decreases, there is an increasing demand for assisting or automating, by means of an image recognition technique, determination as normal or abnormal made by a skillful maintenance worker who carries out an inspection, a test, or the like. In image recognition, it is necessary to improve detection accuracy by using a large volume of learning images (learning data) collected on site. However, when an inspection object (for example, a power transmission line, a bolt, an insulator, a railroad rail, a sleeper, an overhead wire, and the like) has various patterns of views (for example, a position, an inclination, a size, and the like of the inspection object in an image), that is, various patterns of appearances in an image, there is a high possibility that a model for detecting an abnormal part included in the inspection object becomes an unlearned state (under-fitting) where learning is insufficient, or a state of ending up with a local solution rather than an optimum solution. Consequently, sufficient detection accuracy cannot be acquired.

PTL 1 discloses a patrol inspection system that determines an arc mark generated by a stroke of lightning on an overhead ground wire or a power transmission line as abnormal and stably detects the arc mark by means of image processing. PTL 2 discloses a technique for normalizing a contrast of an image to be tested and inspecting deterioration of a concrete surface by using the normalized image.

RELATED DOCUMENT

Patent Document

[PTL 1] Japanese Patent Application Publication No. 2018-074757
[PTL 2] Japanese Patent Application Publication No. 2000-028540

SUMMARY OF THE INVENTION

Technical Problem

In general, an inspection object has mostly the same shape. However, a view (a shape, an angle, a size, or the like) of the inspection object largely varies depending on a structure, a capturing method, and the like. In other words, there are various patterns of appearances of the inspection object in an image. Accordingly, there are also various patterns of views of an abnormal part to be detected. Thus, in order to learn a model for achieving high detection accuracy by using a deep-learning technique and the like, it is required that a large volume of learning data covering all the patterns of views of the abnormal part are collected.

However, with increase in patterns to be learned, there is a high possibility that a model for detecting an abnormal part becomes an unlearned state or a state of ending up with a local solution. Consequently, sufficient detection accuracy cannot be acquired. PTLs 1 and 2 do not mention the above-described problem.

The present invention has been made in view of the above-described problem, and one of objects of the present invention is to provide a technique for improving accuracy in detection of an abnormal part.

Solution to Problem

A first inspection apparatus according to the present invention includes: 1) a transformation unit that detects an inspection object from first image data in which the inspection object is included, and generates second image data by performing a geometric transform on the first image data in such a way that a view of the detected inspection object becomes a view satisfying a predetermined reference; and 2) a detection unit that detects, by using an identification model for detecting an abnormality of the inspection object, an abnormality of the inspection object included in the second image data.

The identification model is learned by using image data in which an inspection object having a view satisfying a predetermined reference is included.

A second inspection apparatus according to the present invention includes: 1) a transformation unit that detects an inspection object from first image data in which the inspection object is included, and generates second image data by performing a geometric transform on the first image data in such a way that a view of the detected inspection object becomes a view satisfying a predetermined reference; and 2) a learning unit that learns, by using the second image data, an identification model for detecting an abnormality of the inspection object.

A first control method according to the present invention is executed by a computer. The control method includes: 1) a transformation step of detecting an inspection object from first image data in which the inspection object is included, and generating second image data by performing a geometric transform on the first image data in such a way that a view of the detected inspection object becomes a view satisfying a predetermined reference; and 2) a detection step of detecting, by using an identification model for detecting an abnormality of the inspection object, an abnormality of the inspection object included in the second image data.

The identification model is learned by using image data in which an inspection object having a view satisfying a predetermined reference is included.

A second control method according to the present invention is executed by a computer. The control method includes: 1) a transformation step of detecting an inspection object from first image data in which the inspection object is included, and generating second image data by performing a geometric transform on the first image data in such a way that a view of the detected inspection object becomes a view satisfying a predetermined reference; and 2) a learning step of learning, by using the second image data, an identification model for detecting an abnormality of the inspection object.

A program according to the present invention causes a computer to execute each of steps in the first control method or the second control method according to the present invention.

Advantageous Effects of Invention

According to the present invention, a technique for improving accuracy in detection of an abnormal part is provided.

BRIEF DESCRIPTION OF THE DRAWINGS

The above-described object and other objects, features, and advantageous effects become more apparent from the preferred example embodiments described below and the following accompanying drawings.

FIG. 13 is a diagram illustrating one example of output information.

DESCRIPTION OF EMBODIMENTS

Hereinafter, example embodiments of the present invention will be described by using the drawings. Note that, a similar component is assigned with a similar reference sign throughout all the drawings, and description therefor will be omitted as appropriate. Further, in each block diagram, each block represents not a configuration on a hardware basis but a configuration on a function basis, except as particularly described.

Example Embodiment 1

Figure 1:
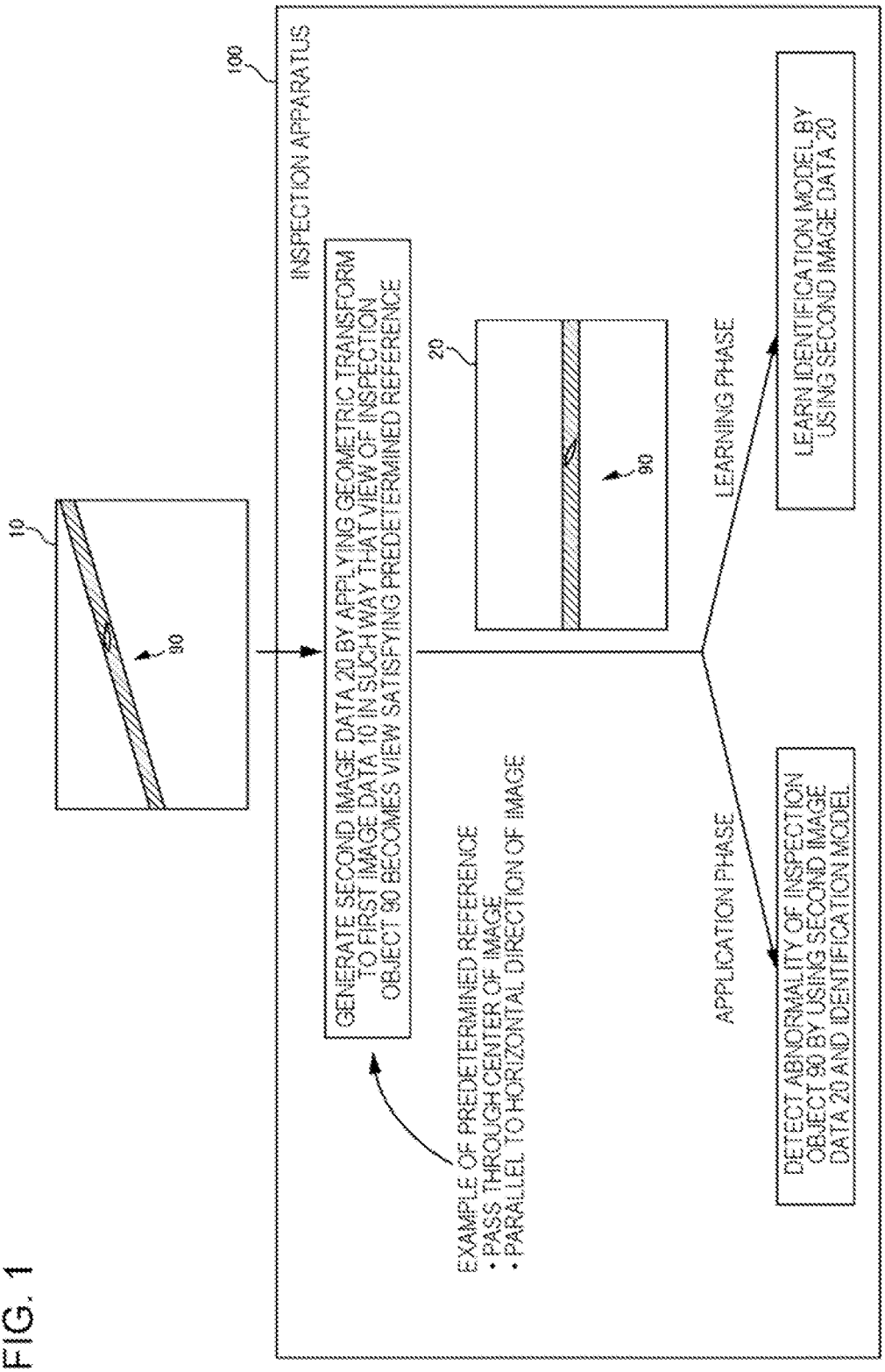
FIG. 1 is a diagram representing an overview of an operation of an inspection apparatus according to an example embodiment 1.

FIG. 1 is a diagram representing an overview of an operation of an inspection apparatus 100 according to an example embodiment 1. Note that, FIG. 1 is illustrative for ease of understanding the inspection apparatus 100, and a function of the inspection apparatus 100 is not limited to the illustration in FIG. 1.

The inspection apparatus 100 detects, by using first image data 10 acquired by capturing an image of an inspection object 90, an abnormality relating to the inspection object 90. The first image data 10 are image data acquired by capturing an image of the inspection object 90.

Figure 2:
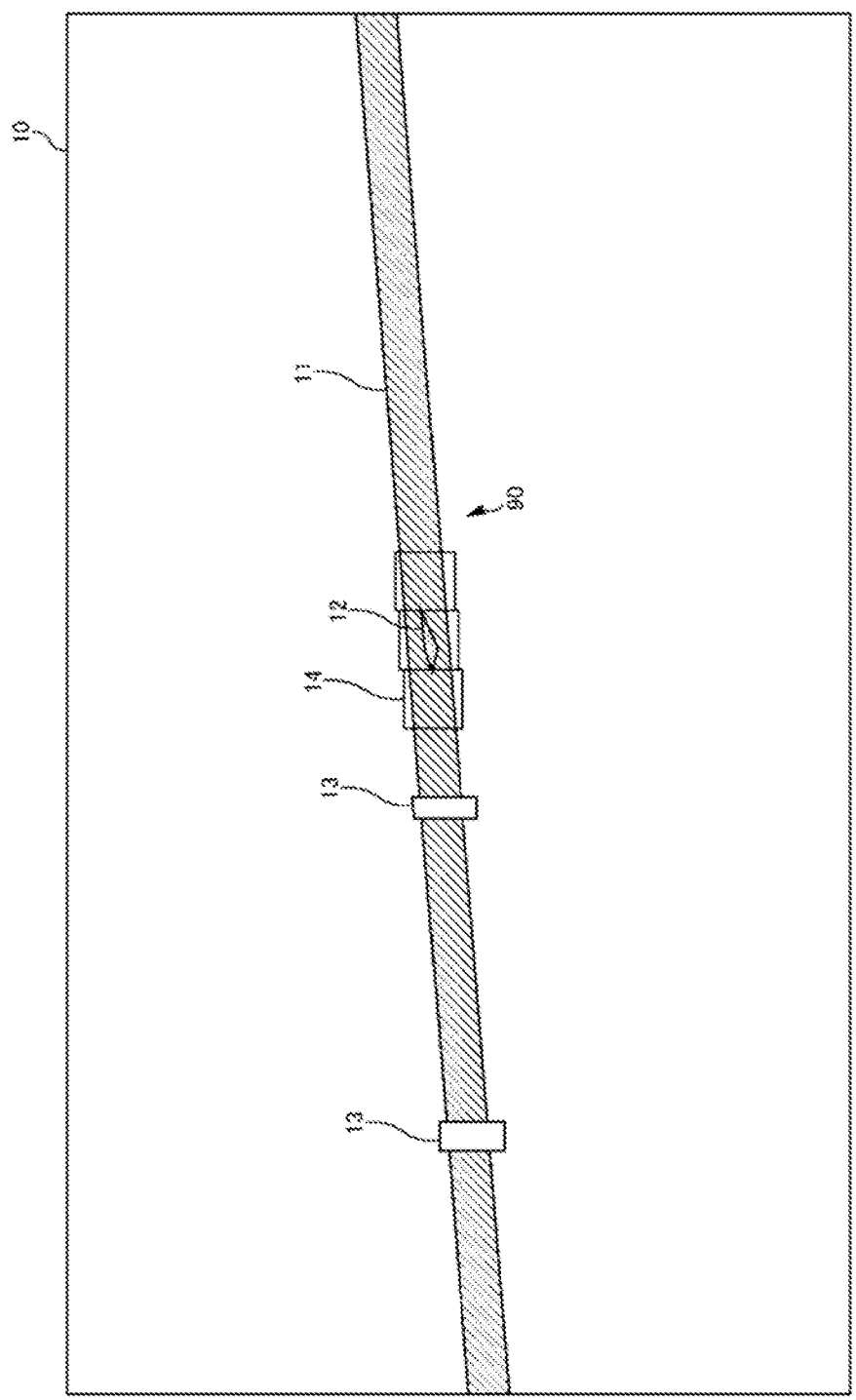
FIG. 2 is a diagram illustrating first image data.
Figure 3:
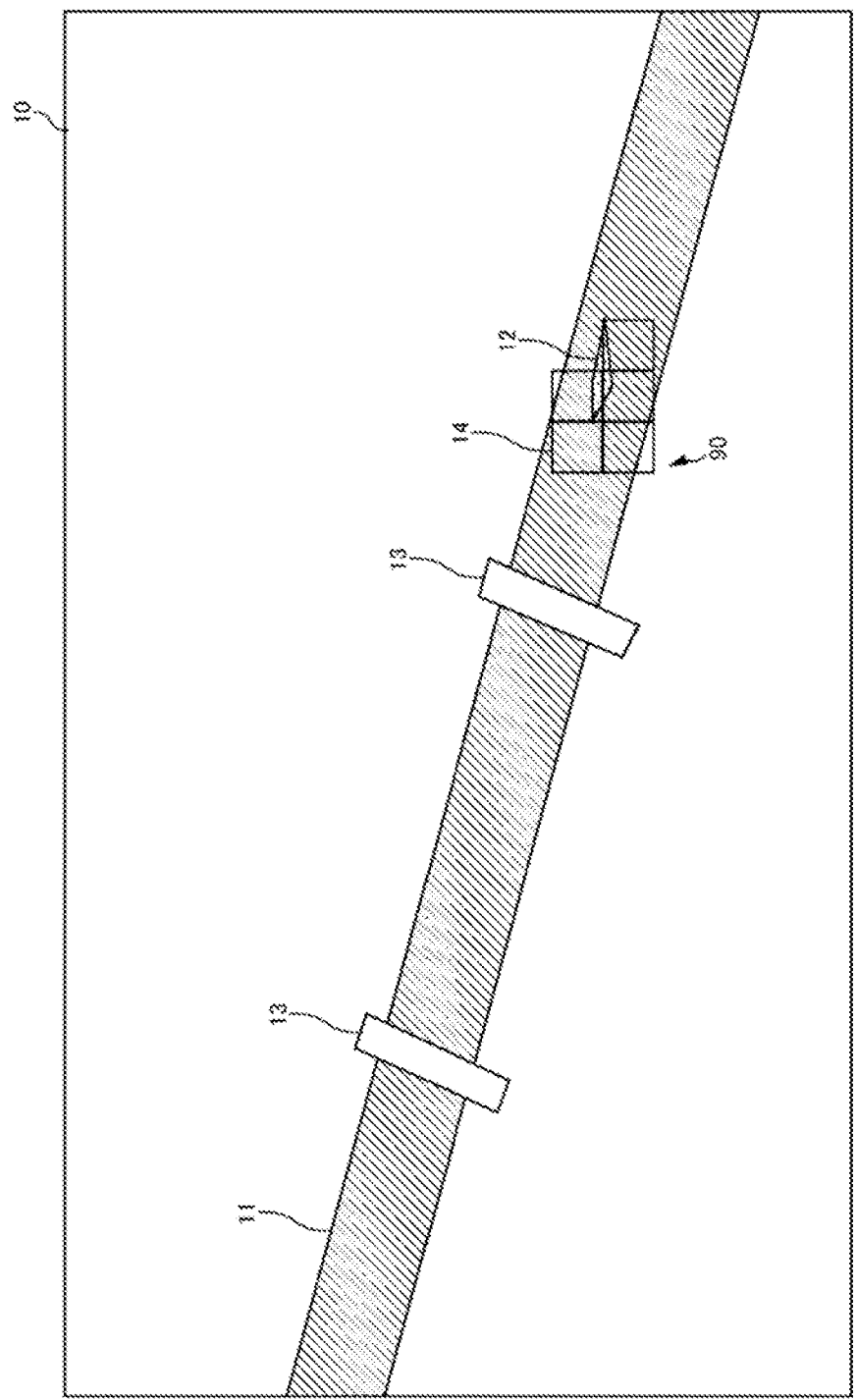
FIG. 3 is a diagram illustrating the first image data.

FIGS. 2 and 3 are diagrams illustrating the first image data 10. Both of the first image data 10 in FIG. 2 and the first image data 10 in FIG. 3 include a power transmission line 11, an arc mark 12, and a snow-resistant ring 13. Herein, the arc mark 12 is an abnormal part. A frame 14 represents an area (hereinafter, an analysis area) as a unit for processing in an image analysis.

Herein, a view of the inspection object 90 on the first image data 10 may vary depending on a position, a pose, and the like of a camera that captures an image of the inspection object 90. The view of the inspection object 90 on the first image data 10 is a position, an angle, a size, and the like of the inspection object 90 on the first image data 10. For example, when the first image data 10 in FIG. 2 are compared with the first image data 10 in FIG. 3, shapes of the power transmission lines are mutually the same, whereas inclinations and sizes of the power transmission lines in the images are mutually different. Thus, a view of the abnormal part may also differ for each image.

In this regard, the inspection apparatus 100 generates, by performing a geometric transform on the first image data 10, image data (second image data 20) in which a view of the inspection object 90 satisfies a predetermined reference. In this way, variation in views of the inspection object 90 included in image data to be analyzed is reduced.

For detection of an abnormality of the inspection object 90, an identification model is used. The identification model is a model learned in such a way that an abnormality of the inspection object 90 included in image data is detected, and is stored in a storage apparatus accessible from the inspection apparatus 100.

In a learning phase for learning the identification model, the inspection apparatus 100 learns the identification model by using the second image data 20. With this, the identification model can detect an abnormality of the inspection object 90 from image data in which the inspection object 90 having a view satisfying a predetermined reference is included.

Further, in an inference phase (application phase) for detecting an abnormality of the inspection object 90 by use of the learned identification model, the inspection apparatus 100 detects an abnormality of the inspection object 90 by using the second image data 20 and the identification model. As described above, the identification model is learned in such a way that an abnormality of the inspection object 90 can be detected from image data in which the inspection object 90 having a view satisfying a predetermined reference is included. Thus, the inspection apparatus 100 can detect an abnormality of the inspection object 90 by using the second image data 20 and the identification model.

One Example of Advantageous Effect

It is assumed that an identification model is learned by using the first image data 10 as is, without performing the geometric transform described above. In this case, variation in views of the inspection object 90 is large for each piece of the first image data 10, and, in order to learn the identification model in such a way as to cover such a large variety of views of the inspection object 90, a large volume of learning data (the first image data 10) is required. Thus, there arises a problem that long time is required for learning or large labor is required for preparing a large volume of learning data.

In this regard, the inspection apparatus 100 generates, by performing a geometric transform on the first image data 10, the second image data 20 in which a view of the inspection object 90 satisfies a predetermined reference, and learns the identification model by using the second image data 20. Therefore, the identification model is learned with learning data having small variation in views of the inspection object 90, and thus, the number of pieces of learning data required for learning the identification model can be reduced. This has an advantageous effect that time required for learning the identification model is shortened and an advantageous effect that the number of pieces of learning data required for learning the identification model can be reduced.

Further, the identification model learned with learning data having small variation can be said to be high in accuracy for identification, in comparison with the identification model learned with learning data having large variation. In this regard, the inspection apparatus 100 generates the second image data 20 from the first image data 10, and detects an abnormality of the inspection object 90 by using the second image data 20 and the identification model. Thus, an abnormality of the inspection object 90 can be detected with high accuracy, in comparison with a case in which an abnormality of the inspection object 90 is detected directly from the first image data 10.

Hereinafter, the inspection apparatus 100 according to the present example embodiment will be described in further detail.

Example of Function Configuration of Inspection Apparatus 100

Figure 4:
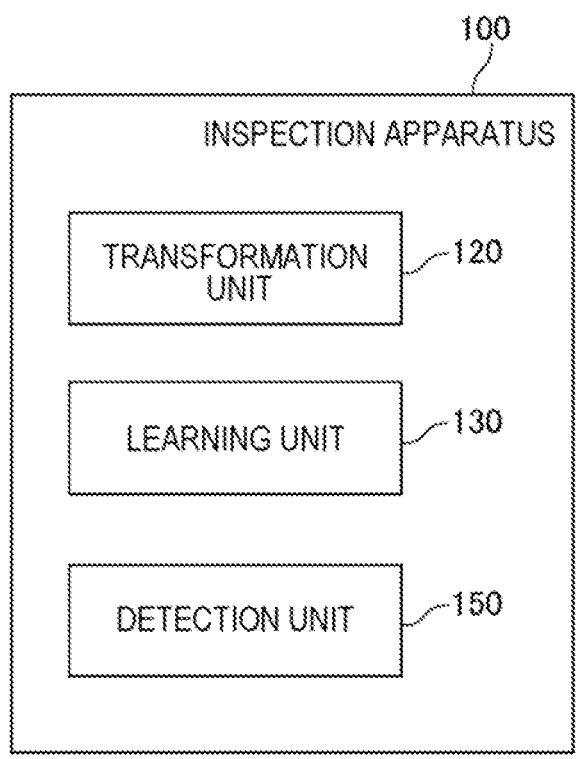
FIG. 4 is a diagram illustrating a configuration of the inspection apparatus according to the example embodiment 1.

FIG. 4 is a diagram illustrating a configuration of the inspection apparatus 100 according to the example embodiment 1. The inspection apparatus 100 includes a transformation unit 120, a learning unit 130, and a detection unit 150. The transformation unit 120 generates the second image data 20 by applying a geometric transform to the first image data 10 in such a way that a view of the inspection object 90 satisfies a predetermined reference. The detection unit 150 detects, by using the second image data 20 and an identification model, an abnormality of the inspection object 90 included in the second image data 20. The learning unit 130 learns an identification model by using the second image data 20.

Herein, the inspection apparatus 100 used in the learning phase and the inspection apparatus 100 used in the inference phase may be separate apparatuses. In this case, the inspection apparatus 100 used in the learning phase includes the transformation unit 120 and the learning unit 130. On the other hand, the inspection apparatus 100 used in the inference phase includes the transformation unit 120 and the detection unit 150.

Hardware Configuration of Inspection Apparatus 100

Each of function configuration units of the inspection apparatus 100 may be achieved by hardware (example: a hard-wired electronic circuit, or the like) achieving each of the function configuration units, or may be achieved by a combination of hardware and software (example: a combination of an electronic circuit and a program controlling the electronic circuit, or the like). Hereinafter, a case will be further described in which each of the function configuration units of the inspection apparatus 100 is achieved by the combination of hardware and software.

Figure 5:
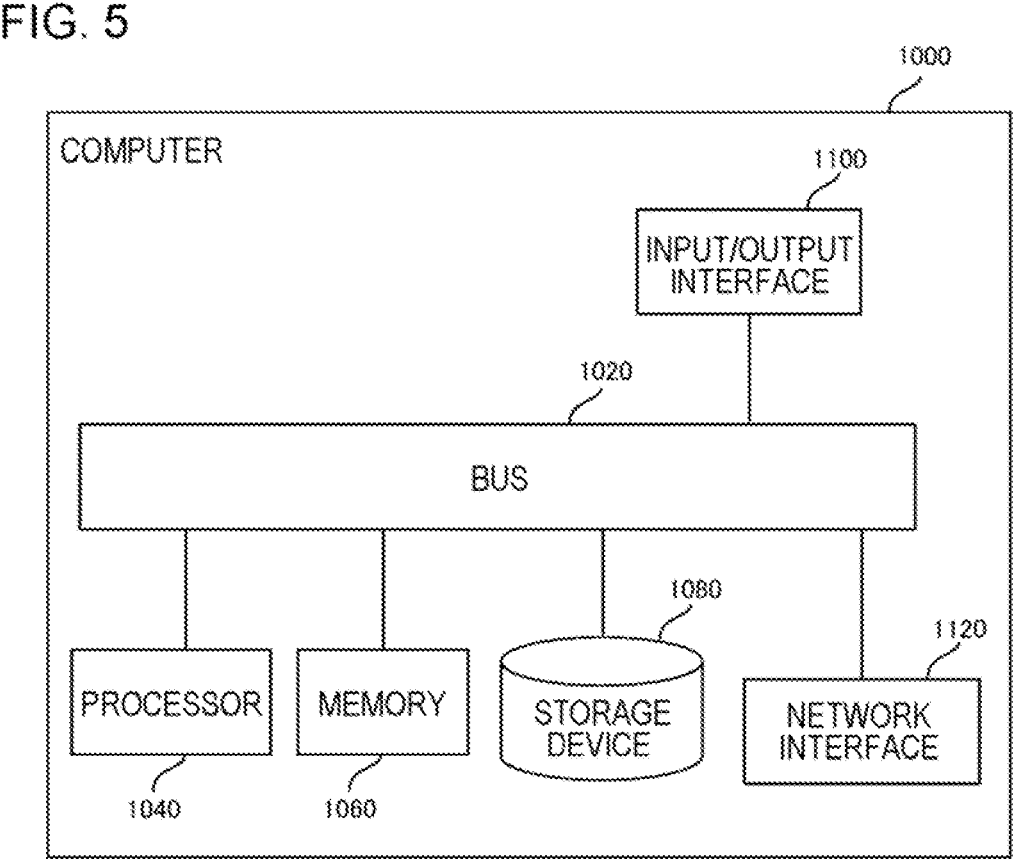
FIG. 5 is a diagram illustrating a computer for achieving the inspection apparatus.

FIG. 5 is a diagram illustrating a computer 1000 for achieving the inspection apparatus 100. The computer 1000 is any computer. For example, the computer 1000 is a personal computer (PC), a server machine, a tablet terminal, a smartphone, or the like. The computer 1000 may be a dedicated computer designed for achieving the inspection apparatus 100, or may be a general-purpose computer.

The computer 1000 includes a bus 1020, a processor 1040, a memory 1060, a storage device 1080, an input/output interface 1100, and a network interface 1120. The bus 1020 is a data transmission path through which the processor 1040, the memory 1060, the storage device 1080, the input/output interface 1100, and the network interface 1120 transmit and receive data to and from one another. However, a method of connecting the processor 1040 and the like with one another is not limited to bus connection. The processor 1040 is a processor such as a central processing unit (CPU), a graphics processing unit (GPU), or a field-programmable gate array (FPGA). The memory 1060 is a main storage apparatus achieved by using a random access memory (RAM) or the like. The storage device 1080 is an auxiliary storage apparatus achieved by using a hard disk drive, a solid state drive (SSD), a memory card, a read only memory (ROM), or the like. However, the storage device 1080 may be configured by hardware, such as a RAM, similar to the hardware configuring the main storage apparatus.

The input/output interface 1100 is an interface for connecting the computer 1000 with an input/output device. The network interface 1120 is an interface for connecting the computer 1000 to a communication network. The communication network is, for example, a local area network (LAN) or a wide area network (WAN). A method by which the network interface 1120 connects to the communication network may be wireless connection, or may be wired connection.

The storage device 1080 stores a program module for achieving the function configuration units of the inspection apparatus 100. The processor 1040 achieves a function relevant to each program module, by reading each of the program modules into the memory 1060 and executing the program module.

Flow of Processing

Figure 6:
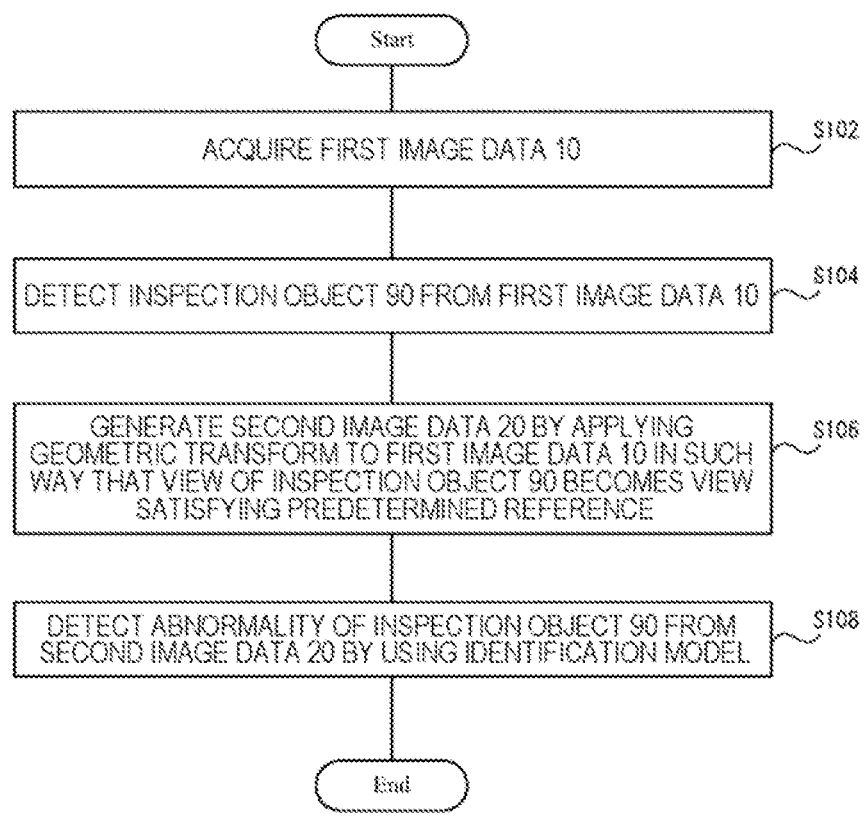
FIG. 6 is a flowchart illustrating a flow of processing executed in an inference phase by the inspection apparatus according to the example embodiment 1.

A flow of processing executed by the inspection apparatus 100 will be described separately for the learning phase and the inference phase. FIG. 6 is a flowchart illustrating a flow of processing executed in the inference phase by the inspection apparatus 100 according to the example embodiment 1. The transformation unit 120 acquires the first image data 10 (S102). The transformation unit 120 detects the inspection object 90 from the first image data 10 (S104). The transformation unit 120 generates the second image data 20 by applying image processing to the first image data 10 in such a way that a view of the inspection object 90 satisfies a predetermined reference (S106). The detection unit 150 detects, by using an identification model, an abnormality of the inspection object 90 included in the second image data 20 (S108).

Figure 7:
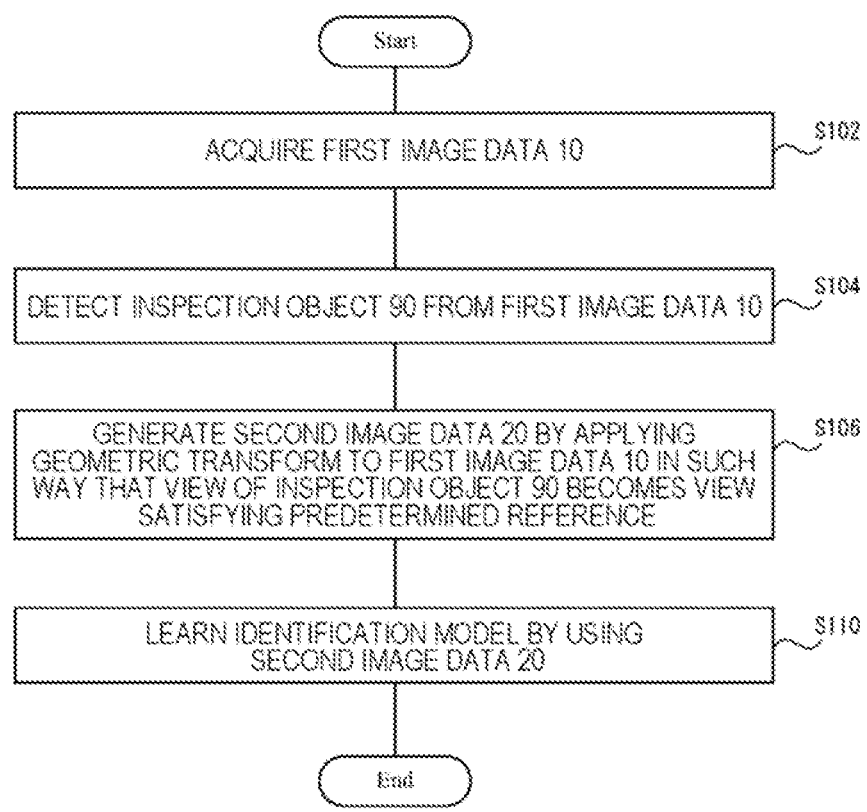
FIG. 7 is a flowchart illustrating a flow of processing executed in a learning phase by the inspection apparatus according to the example embodiment 1.

FIG. 7 is a flowchart illustrating a flow of processing executed in the learning phase by the inspection apparatus 100 according to the example embodiment 1. Note that, S102 to S106 are the same as in FIG. 6. After S106, the learning unit 130 learns an identification model by using the second image data 20 (S110).

Acquisition of First Image Data 10: S102

The transformation unit 120 acquires the first image data 10. Herein, as the first image data 10, image data of any type can be used. For example, as a type of the first image data 10, a color image, a grayscale image, a black-and-white image, a depth image, a temperature image, and the like can be employed. Hereinafter, a case in which the first image data 10 are a color image will be described as an example, but a type of the first image data 10 is not limited to a color image. Further, description will be given with an upper left of the first image data 10 as an origin, and with a horizontal direction and a vertical direction of the first image data 10 as an x-axis and a y-axis, respectively.

The first image data 10 are generated by capturing an image of the inspection object 90 with a camera. Note that, for a method of capturing an image of an inspection object by using a camera, any method can be employed. For example, an image of the inspection object 90 is captured by a camera mounted on an unmanned aircraft such as a drone or a manned aircraft such as a helicopter. Besides the above, for example, an image of the inspection object 90 may be captured from the ground by a person such as an operator.

The transformation unit 120 acquires the first image data 10 by various methods. For example, the transformation unit 120 acquires the first image data 10 from the camera described above. Besides the above, for example, the transformation unit 120 may access a storage apparatus in which the first image data 10 generated by a camera are stored, and thereby acquire the first image data 10 from the storage apparatus.

Detection of Inspection Object 90: S104

The transformation unit 120 detects the inspection object 90 from the first image data 10 (S104). Herein, for a technique for detecting a particular object from an image, a variety of existing techniques can be used. For example, a template image or information indicating a feature value and the like of the inspection object 90 to be detected from the first image data 10 is stored, in advance, in a storage apparatus accessible from the transformation unit 120. The transformation unit 120 detects the inspection object 90 from the first image data 10 by use of these pieces of information.

Generation of Second Image Data 20: S106

The transformation unit 120 generates the second image data 20 by applying a geometric transform to the first image data 10 in such a way that a view of the inspection object 90 satisfies a predetermined reference (S106). For example, the transformation unit 120 generates the second image data 20 according to a flow as follows. First, the transformation unit 120 computes a parameter representing a view of the inspection object 90 on the first image data 10. Hereinafter, the parameter will be referred to as a first parameter. Furthermore, the transformation unit 120 acquires a reference parameter. The reference parameter represents a predetermined reference for a view of the inspection object 90. The transformation unit 120 generates the second image data 20 in which the inspection object 90 having a view satisfying the predetermined reference is included, based on the first parameter computed for the inspection object 90 on the first image data 10, and the reference parameter.

For example, the first parameter can be computed by a following method. The transformation unit 120 performs edge detection on an image area (hereinafter, an inspection object image) representing the inspection object 90 on the first image data 10, and generates edge information consisting of coordinate value information and the like of the detected edge. For edge detection, for example, a variety of approaches such as a Sobel filter, a Laplacian filter, a Canny filter, and the like can be used.

Furthermore, the transformation unit 120 detects a shape of the inspection object 90 by using the edge information, and computes a value of the first parameter expressing the detected shape. For example, for detection of a shape, a Hough transform and the like can be used. Herein, the Hough transform was classically for detecting a line, but has been generalized to enable detection of a desired shape. Hereinafter, a case in which it is known in advance that a shape of an inspection object is a line will be described as an example.

An equation (1) below is an equation of the Hough transform for detecting a line.

[Mathematical 1]

$$\rho = x \cdot \cos \theta + y \cdot \sin \theta \quad (1)$$

In the equation (1), $\rho$ and $\theta$ are parameters for defining a line, and respectively represent a length and an angle of a normal line drawn from an origin to any line. In other words, $\rho$ and $\theta$ can be handled as the first parameter representing one line.

x and y are coordinate values of a pixel on an image. The equation (1) indicates any line passing through coordinate values for (x,y) on an image, and is equivalent to one sine curve on a ($\rho,\theta$) plane (hereinafter, referred to as a Hough space). Note that, when a point on an image is determined, a sine curve is uniquely determined. Further, when a curve related to two points is overlaid on the Hough space, a point of intersection of two curves is related to a line on an image passing through the two points simultaneously.

The transformation unit 120 computes the first parameter ($\rho$ and $\theta$ described above) for a line representing the inspection object 90, by performing the Hough transform using the edge information acquired by performing edge detection on the inspection object image. For example, the transformation unit 120 substitutes coordinate values (x,y) of all pixels forming an edge for the equation (1), and superimposes a plurality of curves on the Hough space. Then, the transformation unit 120 computes, based on overlapping of the superimposed curves, the first parameter ($\rho$ and $\theta$) for each of one or more lines detected from the inspection object image.

For example, the transformation unit 120 determines a pair of $\rho$ and $\theta$ that maximizes the number of overlapping curves superimposed on the Hough space, and determines the pair as the first parameter. In this case, one line is detected from the inspection object image.

Besides the above, for example, the transformation unit 120 may determine a pair of $\theta$ and p that maximizes the number of overlapping curves superimposed on the Hough space, and may detect a shape having a parameter of a degree of divergence from at least one among the pair being equal to or less than a predetermined threshold value. In this way, for example, a line substantially parallel to a first detected line can be further detected. When the inspection object 90 is a cable or the like having a certain degree of thickness, a boundary between the inspection object 90 and a background is represented by two lines substantially parallel to each other (see FIGS. 2 and 3). According to the method described above, a parameter representing each of two lines in such a relationship can be computed.

Herein, the transformation unit 120 in the learning phase may use teaching data representing a target to be processed. Hereinafter, a case in which the teaching data are an image will be described as an example, but the teaching data are not limited thereto.

Figure 8:
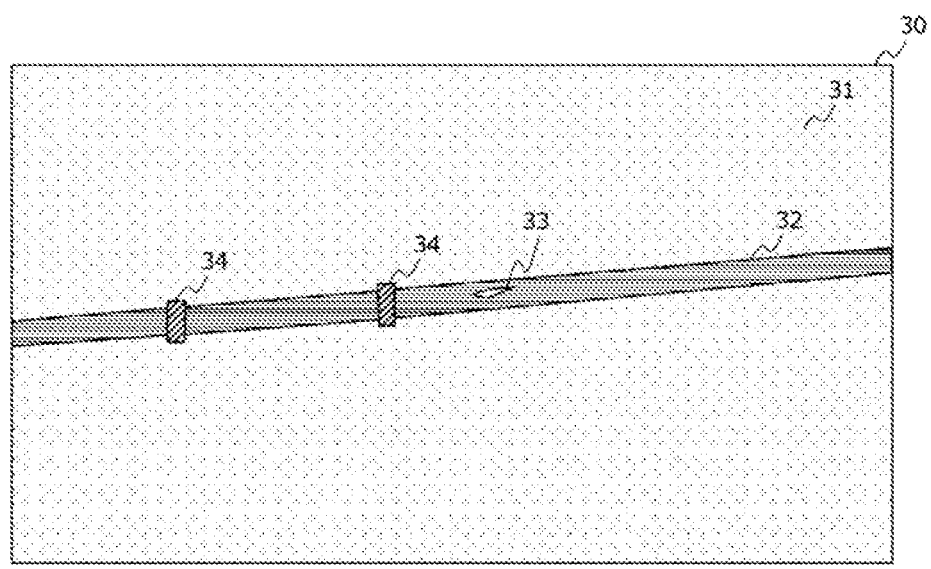
FIG. 8 illustrates one example of teaching data.

FIG. 8 illustrates one example of teaching data. Teaching data 30 illustrated in FIG. 8 are prepared from the first image data 10, and include a background 31, a power transmission line 32, an arc mark 33, and a snow-resistant ring 34 illustrated with different patterns. The teaching data 30 may be prepared, for example, by painting areas such as the background 31, the power transmission line 32, the arc mark 33, and the snow-resistant ring 34 in different colors. The teaching data 30 are prepared, for example, manually by an operator or the like. The teaching data 30 clearly indicate a boundary between an inspection object and a background. Thus, the transformation unit 120 can detect a shape of the inspection object 90 more easily than detecting a shape of the inspection object 90 from the first image data 10.

Figure 9:
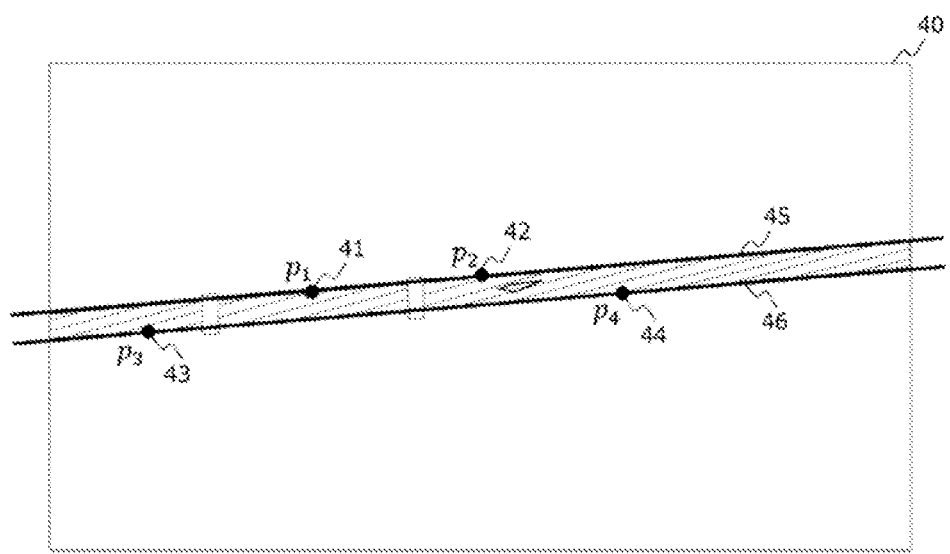
FIG. 9 illustrates one example of different teaching data.

FIG. 9 illustrates one example of different teaching data. Teaching data 40 illustrated in FIG. 9 are prepared from the first image data 10, and consist of a point 41, a point 42, a point 43, and a point 44 each input by an operator with a pointing device or the like. The transformation unit 120 may detect, as a shape of the inspection object 90, for example, a line 45 passing through the point 41 and the point 42 and a line 46 passing through the point 43 and the point 44 by using the teaching data 40. The teaching data 40 have an advantageous effect of reducing operation load on an operator in preparation of teaching data, in comparison with the teaching data 30.

Further, the teaching data may be, for example, an area specified by an operator tracing, with a finger or a device such as a pen, on an image displayed on a display device such as a touch panel.

Note that, the transformation unit 120 may search for the first parameter of the inspection object 90 detected from the currently processed first image data 10, by using the first parameter of the inspection object 90 acquired from the previously processed first image data 10. For example, it is assumed that the first image data 10 are a video frame acquired from a video camera. Herein, a specific example will be described by using, as an example, a case in which a shape of the inspection object 90 is a line.

As an example, it is assumed that a parameter $(\rho_t, \theta_t)$ of a line is to be computed for the inspection object 90 detected from the first image data 10 acquired at a time t. Further, it is assumed that a parameter $(\rho_{t-1}, \theta_{t-1})$ of a line is already computed for the inspection object 90 detected from the first image data 10 acquired at a time t-1. Herein, when frequency of generation of the first image data 10 is high enough, such as when the first image data 10 are a video frame generated by a video camera, a view of the inspection object 90 detected from the first image data 10 acquired at the time t is thought almost the same as a view of the inspection object 90 detected from the first image data 10 acquired at the time t-1.

In view of the above, in this case, the transformation unit 120 searches for $(\rho_t, \theta_t)$ with $(\rho_{t-1}, \theta_{t-1})$ as a reference. For example, by using predetermined threshold values $\alpha$ and $\beta$, the transformation unit 120 searches for a value for $\rho_t$ within a range of $\rho_{t-1} \pm \alpha$ and a value for $\theta_t$ within a range of $\theta_{t-1} \pm \beta$, respectively. According to the method, a search range (search space) for a parameter $(\rho, \theta)$ of a line can be limited, and thus, an advantageous effect of enabling improvement in processing speed can be acquired.

Figure 10:
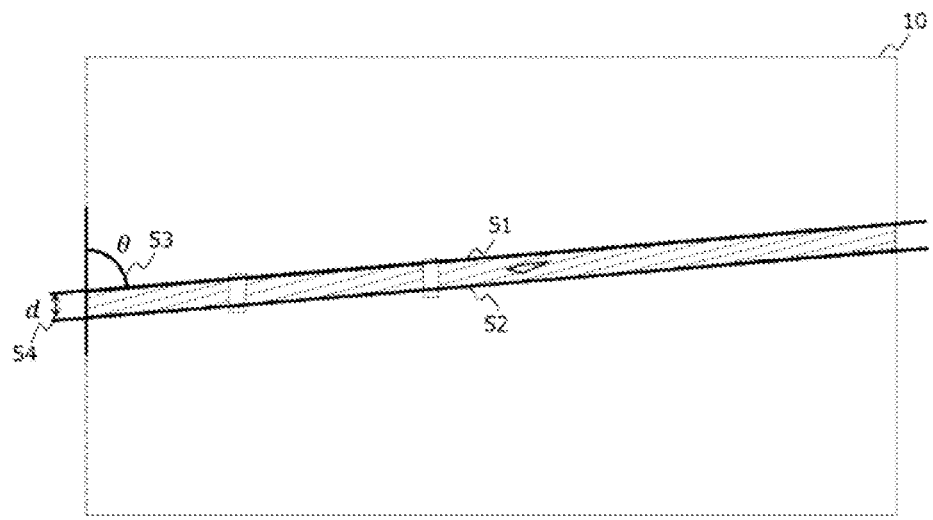
FIG. 10 illustrates one example of a result of detecting a line on the first image data.

FIG. 10 illustrates one example of a result of detecting a line on the first image data 10. Herein, a line 51 and a line 52 are detected and are superimposed on the first image data 10. Note that, in the present example, an angle 53 formed by the detected line and a vertical direction of the image is θ, and a distance 54 between the line 51 and the line 52 is d.

Herein, the distance d between two lines can be also used as the first parameter. Specifically, as will be described later, a ratio of enlargement or shrinkage to be applied to an inspection object image can be determined based on the distance d between two lines.

The transformation unit 120 generates, by using the first parameter computed for the inspection object 90 on the first image data 10, the second image data 20 in which the inspection object 90 having a view satisfying a predetermined reference is included. For example, it is assumed that the inspection object 90 is represented by a line. In this case, for example, the transformation unit 120 generates the second image data 20 in such a way that a parameter of a line representing the inspection object 90 on the second image data 20 satisfies a predetermined reference.

Generation of the second image data 20 is performed by using a reference parameter representing the predetermined reference described above. The transformation unit 120 generates the second image data 20 by applying a predetermined geometric transform to the first image data 10, and thereby a degree of divergence between a parameter (hereinafter, a second parameter) representing the inspection object 90 on the second image data 20 and the reference parameter reduces.

For example, it is assumed that a parameter $(\rho_r, \theta_r)$ representing a line as a reference is determined as a reference parameter. Further, it is assumed that a parameter $(\rho_1, \theta_1)$ of a line is acquired as the first parameter representing the inspection object 90 on the first image data 10. In this case, the transformation unit 120 generates the second image data 20 by performing a geometric transform on the first image data 10 in such a way that a parameter $(\rho_2, \theta_2)$ of a line as the second parameter representing the inspection object 90 on the second image data 20 has a small degree of divergence from the reference parameter $(\rho_r, \theta_r)$. The geometric transform is, for example, parallel translation, rotation, scaling, and the like. Hereinafter, a method of computing a geometric transform parameter will be described by using FIG. 10.

For example, the transformation unit 120 may determine an area between the line 51 and the line 52 illustrated in FIG. 10 as an inspection object area, select any point within the inspection object area as a first point, select any point on the first image data 10 as a second point, and compute a parameter for parallel translation in such a way that the selected first point meets the selected second point. Such parallel translation is useful, for example, for preventing a part of the inspection object 90 from not being included in the second image data 20 due to rotation or the like.

Besides the above, for example, the transformation unit 120 computes a difference between a reference angle preliminarily determined for an angle formed by a line representing the inspection object 90 and a vertical direction of the image and the angle 53 illustrated in FIG. 10, and determines the computed difference as a parameter for rotation. Besides the above, for example, the transformation unit 120 may compute a difference between $\theta_r$ included in the reference parameter of the line described above and θ included in a parameter of a line computed for the inspection object 90 detected from the first image data 10, and may determine the computed difference as a parameter for rotation.

Besides the above, for example, the transformation unit 120 computes a ratio between a reference distance preliminarily determined for two lines representing the inspection object 90 and the distance 54 illustrated in FIG. 10, and determines the computed ratio as a parameter for scaling. Besides the above, for example, the transformation unit 120 may compute a ratio between $\rho_r$ included in the reference parameter of the line described above and ρ computed for the inspection object 90 detected from the first image data 10, and may determine the computed ratio as a parameter for scaling.

A method of computing a geometric transform parameter is not limited to the method described above, and any method that can transform a view of the inspection object 90 detected from the first image data 10 into a view satisfying a predetermined reference can be used. For example, it is assumed that a parameter $(\rho_1, \theta_1)$ representing a shape of a line is acquired for the inspection object 90 on the first image data 10 and $(\rho_r, \theta_r)$ is determined as a reference parameter. In this case, for example, when a line determined by $(\rho_1, \theta_1)$ is transformed by an appropriate affine transformation into a line determined by $(\rho_r, \theta_r)$, a line representing the inspection object 90 on the first image data 10 can meet a line as a reference. In view of this, for example, the transformation unit 120 computes a transformation matrix for transforming $(\rho_1, \theta_1)$ into $(\rho_r, \theta_r)$ as a geometric transform parameter. Then, the transformation unit 120 generates the second image data 20 by performing an affine transformation represented by the computed transformation matrix on the first image data 10. Herein, for an approach to compute a transformation matrix for a geometric transform based on parameters of a line before and after the geometric transform, an existing approach can be used.

Figure 11:
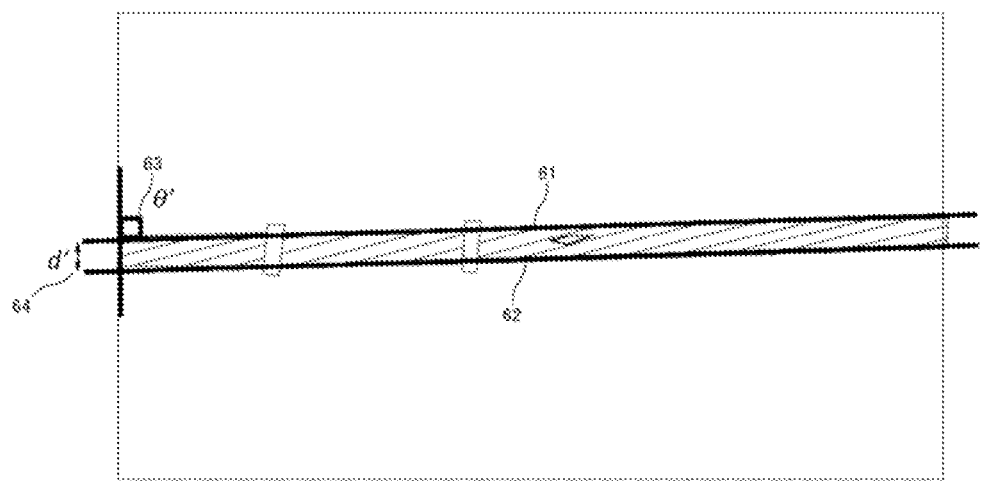
FIG. 11 illustrates one example of second image data according to the present example embodiment.

FIG. 11 illustrates one example of the second image data 20 according to the present example embodiment. In the present example, a parallel-translational geometric transform is performed in such a way that a center point of the inspection object 90 meets a center point of the image. Further, in the present example, a rotational geometric transform is performed in such a way that an angle 63 formed by a line 61 and a vertical direction of the image becomes $\partial'$, with the center point of the image as an origin. Further, in the present example, a scaling geometric transform is performed in such a way that a distance 64 between two detected lines becomes d'.

Herein, the geometric transform performed by the transformation unit 120 may be a part of the parallel translation, the rotation, and the scaling described above. For example, it is assumed that the transformation unit 120 performs parallel translation and rotation but does not perform scaling on the first image data 10. In this case, since an image is not transformed by using a parameter for scaling, an inspection object has a size different for each image. In view of this, an analysis area as a unit for an analysis in learning or inference may have a size determined for each image.

The size of the analysis area is determined, for example, based on a size of the inspection object 90 on an image. For example, it is assumed that the distance 54 between the line 51 and the line 52 illustrated in FIG. 10 is the size of the analysis area. Specifically, it is assumed that, when the distance 54 is 32 pixels, the size of the analysis area is 32×32 pixels. However, the size of the analysis area can be any size suitable for detection of an abnormality, and is not limited to a size determined by the method described above.

Learning of Identification Model: S110

In the learning phase, the learning unit 130 learns an identification model by using the second image data 20 (S110). The identification model extracts a plurality of local area images (hereinafter, patch images) from the second image data 20, and identifies an abnormality and normality by using the extracted local area images. The patch image represents one analysis area. Herein, in order to learn the identification model, a label indicating whether the patch image is abnormal or normal (whether a part of the inspection object 90 represented by the patch image is normal) is prepared for each patch image. The label is prepared, for example, manually by an operator or the like. Hereinafter, the label will be referred to as a teaching label. The teaching label may be referred to as correct answer data and the like.

In the following description, the teaching label indicating an abnormality will be represented as "1", and the teaching label indicating normality will be represented as "0". However, the teaching label is not limited to a case of binary representation as 0 or 1. For example, the teaching label may be a value (for example, any real number between 0 and 1 inclusive) representing a degree of normality or a degree of abnormality of a part of the inspection object 90 represented by the patch image.

The identification model is learned by using an abnormal patch image and a normal patch image, and is achieved by any model such as a binary classifier or a multinomial classifier that can classify the patch images into two types or more. For example, the identification model is achieved by a convolutional neural network. Hereinafter, a case in which the identification model is achieved by a convolutional neural network will be described as an example.

In the following description, a result of determination as abnormal will be represented as "1", and a result of determination as normal will be represented as "0". However, similarly to the teaching label, a result of determination is also not limited to binary representation as normal or abnormal, and may represent a degree of normality or a degree of abnormality.

The learning unit 130 inputs the patch image to the identification model. Consequently, a result of determination indicating whether the input patch image is normal or abnormal is output from the identification model. Herein, as described above, an analysis area may have a size different for each second image data 20. Thus, the patch image may have a size different for each second image data 20. In view of this, a reference size for the patch image may be determined in advance, and the learning unit 130 may enlarge or shrink the size of the patch image in such a way as to meet the reference size, and may thereafter input the patch image to the identification model.

The learning unit 130 updates (learns) the identification model, based on the result of determination output from the identification model and the teaching label. In updating of the identification model, for example, a parameter set in the identification model is updated. Specifically, the learning unit 130 updates the identification model in such a way as to minimize an error representing a degree of divergence between the result of determination on the patch image and the teaching label related to the patch image. For example, when the result of determination on the patch image including an abnormality (the patch image with the related teaching label of "1") is a value "1" representing abnormality, a degree of divergence between the result of determination and the teaching label is 0. On the other hand, when the result of determination on the patch image including an abnormality is a value "0" representing normality, a degree of divergence between the result of determination and the teaching label is 1.

Herein, for a method of defining the error for use in updating of the identification model, various methods can be employed in response to a type of the identification model. For example, a loss function E for computing an error between the result of determination and the teaching label is defined in advance. The learning unit 130 optimizes, based on the result of determination and the teaching label, the parameter in the identification model in such a way as to minimize the loss function E. Herein, for a specific method of updating the parameter in the identification model by using a loss function, a variety of existing methods can be used.

For example, the loss function E can be defined by an equation (2) below.

[Mathematical 2]

$$E = -\sum_{n=1}^{N}\sum_{k'=1}^{K} t_{k'n} \log p_{k'}(x_n) \quad (2)$$

In the equation (2), N represents the number of pieces of data, and K represents the total number of classes for classification. Further, $t_{k'n}$ in the equation (2) is a vector of a correct answer label for n-th input data, and is a so-called 1-of-k vector (a vector with only a certain element being 1 and other elements being 0). A class having a value of 1 in $t_{k'n}$ represents a correct answer class. For example, it is assumed that k=0 is a class representing normality and k=1 is a class representing abnormality, in a case of binary identification as abnormal or normal.

In this case, a correct answer vector related to input data representing normality is (1, 0), and a correct answer vector related to input data representing abnormality is (0, 1).

$P_{k'}(x_n)$ in the equation (2) indicates a probability that the n-th input data belong to a class k'. For example, as described above, it is assumed that k=0 is a class representing normality and k=1 is a class representing abnormality. In this case, $P_0(x_n)$ represents a probability that input data $x_n$ belong to the class representing normality, and $P_1(x_n)$ represents a probability that the input data $x_n$ belong to the class representing abnormality. The probability $P_{k'}(x_n)$ is computed by an equation (3) illustrated below.

[Mathematical 3]

$$P_k(x_n) = \frac{e^{f_k(x_n)}}{\sum_{k'=1}^{K} e^{f_{k'}(x_n)}} \quad (3)$$

In the equation (3), $f_k(x_n)$ is an output value of a class k for the n-th input data $x_n$.

Detection of Abnormality (Execution of Inference): S108

In the inference phase, the detection unit 150 detects, by using the second image data 20 and an identification model, an abnormal part of the inspection object 90 included in the second image data 20 (S108). Specifically, the detection unit 150 extracts a plurality of patch images from the second image data 20 and inputs each of the patch images to an identification model, similarly to the learning unit 130. With this, a result of determination on each patch image is output from the identification model. For example, the result of determination represents whether the input patch image is normal or abnormal, or represents a degree of normality or a degree of abnormality of the input patch image. Herein, similarly to the learning, an analysis area may have a size different for each second image data 20. In view of this, in this case, for example, the detection unit 150 enlarges or shrinks the patch image acquired from the second image data 20 in such a way as to meet a reference size, and inputs the patch image to the identification model.

Output of Result

Figure 12:
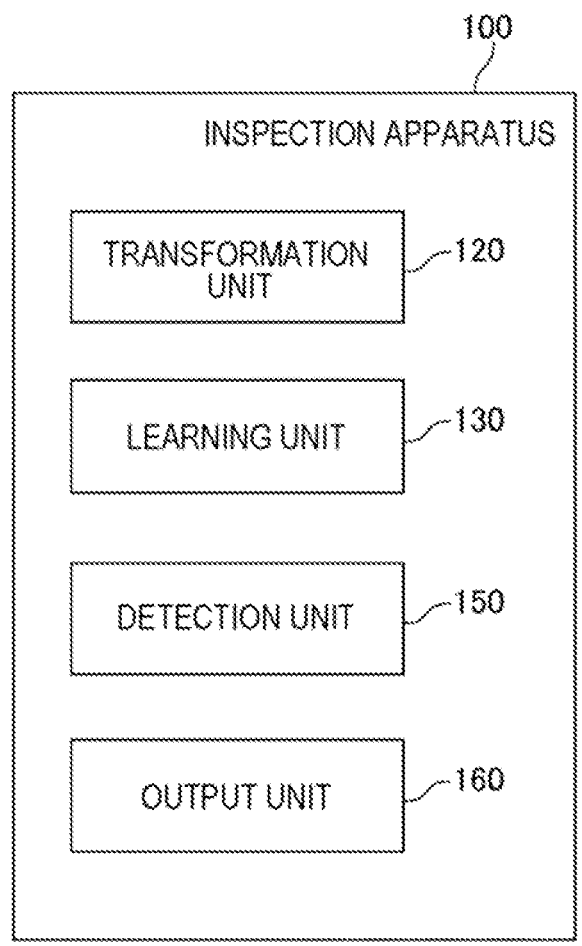
FIG. 12 is a block diagram illustrating a function configuration of the inspection apparatus including an output unit.

The inspection apparatus 100 generates output information, based on a result of detection by the detection unit 150. Herein, a function configuration unit that generates and outputs output information will be referred to as an output unit. FIG. 12 is a block diagram illustrating a function configuration of the inspection apparatus 100 including an output unit 160.

The output unit 160 generates output information, based on a result of determination on each patch image acquired from an identification model. For example, the output information indicates one or more pairs of "identification information of the second image data 20 from which an abnormality is detected and a position of an abnormal part detected from the second image data 20 (a position of the patch image from which the abnormality is detected)". For the identification information of the second image data 20, any information capable of identifying an image can be used. For example, the identification information of the second image data 20 is a file name given to the second image data 20. Besides the above, for example, the identification information of the second image data 20 may be a file name or the like of the first image data 10 being a generation source of the second image data 20. Further, when the first image data 10 are video frames constituting a video, a combination or the like of a file name of a video file including the first image data 10 and a frame number of the first image data 10 can be also used for identification information of the first image data 10.

The output information may further indicate identification information of the second image data 20 from which no abnormality is detected. Use of such output information enables recognition of whether an abnormality is detected from each second image data 20 and recognition of an abnormal part of the second image data 20 from which an abnormality is detected.

Note that, instead of the second image data 20, information on the first image data 10 used for generation of the second image data 20 may be output. For example, when an abnormality is detected from certain second image data 20, the detection unit 150 generates output information indicating a pair of "identification information of the first image data 10 being a transformation source of the second image data 20 and a position on the first image data 10 relevant to an abnormal part detected from the second image data 20". Herein, a position on the first image data 10 relevant to an abnormal part detected from the second image data 20 can be determined, for example, by performing, on the abnormal part detected from the second image data 20, an inverse transform of a geometric transform performed to generate the second image data 20 from the first image data 10.

The output information is output by any output method. For example, the output information is stored in any storage apparatus. Besides the above, for example, the output information is output to a display apparatus connected with the inspection apparatus 100. Besides the above, for example, the output information may be transmitted from the inspection apparatus 100 to another apparatus. In this case, the output information is displayed on, for example, a display apparatus connected with the another apparatus.

FIG. 13 is a diagram illustrating one example of output information. The output information in FIG. 13 indicates information on each patch image determined as abnormal. Specifically, identification information of the second image data 20 in which the patch image is included, a score (such as a probability that the patch image represents an abnormality) output by an identification model for the patch image, and a position of the patch image on the second image data 20 are indicated. Note that, in FIG. 13, the position of the patch image is represented by coordinates of four corners of the patch image. In this regard, information representing the position of the patch image is not limited to a method of representation by coordinates of four corners, but any method of determining an area on an image can be used. For example, the position of the patch image can be determined also by three values being coordinates of an upper-left corner, a width, and a height.

Figure 14:
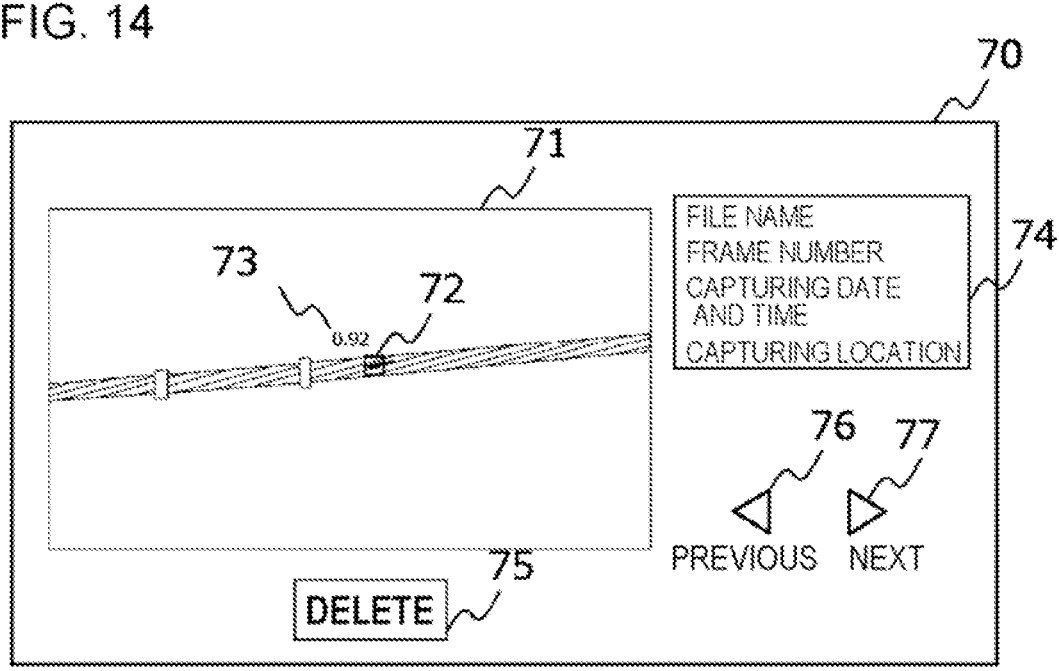
FIG. 14 is a diagram illustrating the second image data on which a display representing an abnormal part is superimposed.

The output information is not limited to the above-described contents. For example, the output information may be information including the second image data 20 or the like on which a display representing an abnormal part is superimposed. FIG. 14 is a diagram illustrating the second image data 20 on which a display representing an abnormal part is superimposed. FIG. 14 includes an output screen 70 being output to a display apparatus or the like connected with the inspection apparatus 100. The output screen 70 includes a display area 71 in which a part or whole of the second image data 20 is displayed. The display area 71 includes at least an image area 72 that represents an abnormal part detected from the second image data 20. The image area 72 represents a patch image determined as abnormal among patch images acquired from the second image data 20.

Herein, in FIG. 14, the image area 72 is surrounded by a frame. The frame is equivalent to the "display representing an abnormal part" described above. Such a display enables a user of the inspection apparatus 100 to easily recognize an abnormal part.

Further, on the output screen 70, a score 73 is displayed near the image area 72. The score 73 represents a score output by an identification model for the related image area 72 (i.e., a patch image). Such a display of the score near the display representing an abnormal part enables a user of the inspection apparatus 100 not only to recognize a part determined as abnormal, but also to recognize a degree of probability that the part is abnormal. With this, efficient measure for an abnormality of the inspection object 90 can be performed such as, for example, preferentially checking of an abnormal part having a high score.

The output screen 70 further includes a display area 74 in which metadata on the second image data 20 from which an abnormality is detected are displayed. Specifically, in FIG. 14, a file name, a frame number, a capturing date and time, and a capturing location are indicated. Herein, these pieces of information are information on the first image data 10 being a transformation source of the second image data 20.

The output screen 70 further includes switch buttons 76 and 77 for switching the second image data 20 displayed in the display area 71 and a delete button 75. The delete button 75 is a button for changing a result of determination on the image area 72 to "normal" when a user viewing the output screen 70 determines that the image area 72 is misrecognized (i.e., the image area 72 does not represent an abnormal part). Specifically, a user clicks the delete button 75, by using a pointing device or the like, after specifying the image area 72 on which an erroneous result of determination is made. In this way, a result of determination on a patch image related to the specified image area 72 is changed from abnormal to normal. Note that, in this case, instead of overwriting a result of determination on a patch image indicated by output information, a result of determination (i.e., normal) by a user may be added to the output information while leaving the result of determination.

Herein, the learning unit 130 may learn by using a patch image for which a result of determination is changed by a user in this way. In other words, the learning unit 130 learns an identification model by use of learning data in which a teaching label as "normal" is related to the image area 72 where the delete button 75 is depressed by a user. In this way, the identification model has a lower probability of causing a similar determination error, and thus, accuracy in detection of an abnormality of the inspection object 90 by using the identification model is improved.

The output unit 160 may determine a patch image to be displayed as the image area 72, based on a score related to the patch image. For example, the output unit 160 displays, as the image area 72, patch images each having a score equal to or more than a predetermined threshold value. Besides the above, for example, the output unit 160 may display, as the image area 72, patch images within a predetermined rank in descending order of related scores. The predetermined threshold value and the predetermined rank may be fixedly determined, or may be specifiable by a user of the inspection apparatus 100.

Further, the output unit 160 may change a type, a color, and the like of a display to be superimposed on a patch image in response to a score. For example, when a score represents a degree of abnormality, a domain of the score is divided into five numerical ranges, and different colors are allocated to the numerical ranges. For example, "blue", "green", "yellow", "orange", and "red" are allocated in ascending order of the degree of abnormality. The output unit 160 determines, for each patch image, a numerical range to which a score of the patch image belongs, and superimposes, on the patch image, a display of a color related to the determined numerical range.

Herein, it is assumed that, when a patch image is extracted from the second image data 20, extraction is performed in such a way that adjacent patch images overlap one another. Then, it is assumed that patch images having a score of a predetermined threshold value or more overlap one another. In this case, the output unit 160 may display, as the image area 72, only some (for example, one patch image having a maximum score) of the mutually overlapping patch images. Besides the above, for example, regarding patch images overlapping one another in this way, one image area represented by a sum of the mutually overlapping patch images may be displayed as the image area 72.

Figure 15:
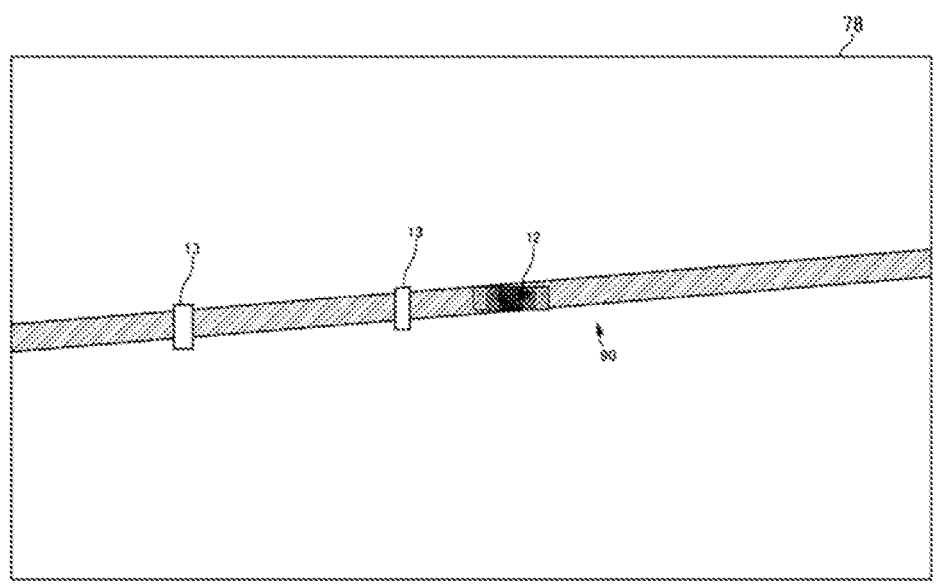
FIG. 15 is one example of a degree of overlapping of patch images illustrated by a heat map.

Besides the above, for example, the output unit 160 may represent a degree of overlapping of the mutually overlapping patch images by using a heat map or the like. FIG. 15 is one example of a degree of overlapping of patch images illustrated by a heat map. In an example of a heat map 78 illustrated in FIG. 15, as overlapping of patch images increases, density of black dots becomes larger.

Herein, in the present example embodiment, for convenience, the heat map is illustrated with density of black dots. However, the output unit 160 may express the heat map with a gray scale or colors. For example, as a degree of overlapping of patch images increases, color changes in order of "blue", "green", "yellow", "orange", and "red".

Herein, it is assumed that a result of determination on a patch image is represented by a value between 0 to 1 in response to a degree of abnormality. In this case, the output unit 160 computes, for example, a degree of overlapping of patch images by weighted addition of results of determination on the patch images. Specifically, when an amount of x-axis movement and an amount of y-axis movement of an analysis area are quarter a width and a height of the analysis area, respectively, sixteen times of inference are performed on any area of an inspection object, and thus, a total sum of results of determination may be divided by 16.

Other Functions

Figure 16:
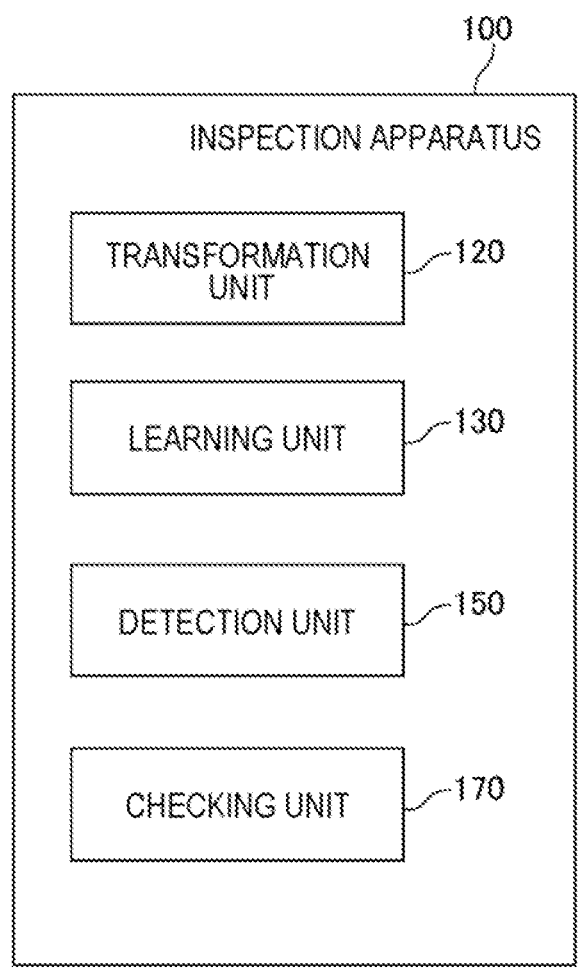
FIG. 16 is a block diagram illustrating a function configuration of the inspection apparatus including a checking unit.

The inspection apparatus 100 may further include a function described below. For example, the inspection apparatus 100 may include a function of accepting an input for checking that the first parameter of the inspection object 90 has been correctly detected from the first image data 10. A function configuration unit having the function will be referred to as a checking unit. FIG. 16 is a block diagram illustrating a function configuration of the inspection apparatus 100 including a checking unit 170.

Figure 17:
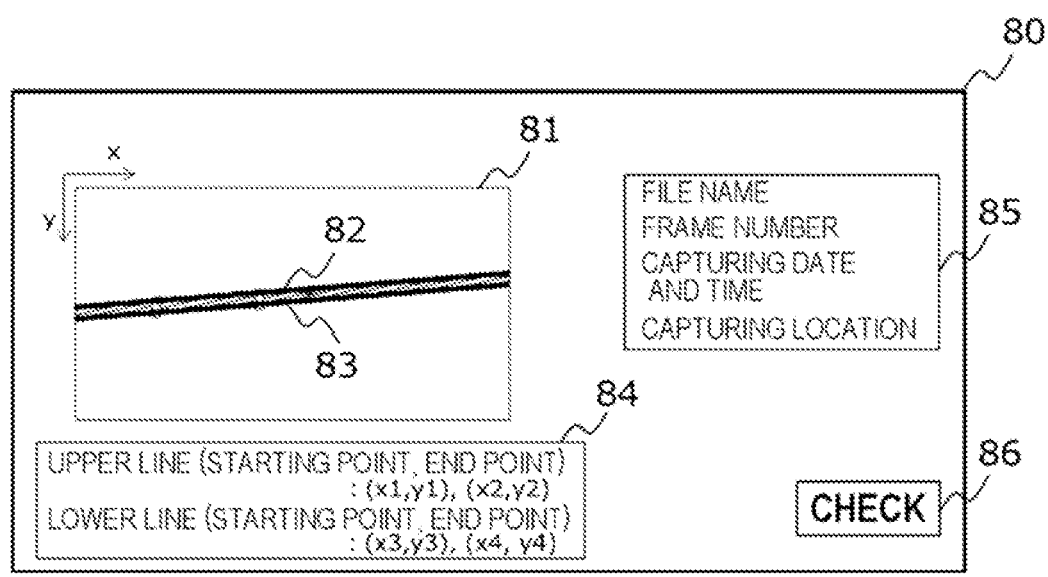
FIG. 17 is a diagram illustrating a screen output by the checking unit.

FIG. 17 is a diagram illustrating a screen output by the checking unit 170. A screen 80 illustrated in FIG. 17 includes a display area 81 that displays an image. The image displayed in the display area 81 is, for example, an image in which a display representing a shape of the inspection object 90 is superimposed on the first image data 10. In an example illustrated in FIG. 17, a plurality of lines (a line 82 and a line 83) detected from the first image data 10 are superimposed on the first image data 10, as a display representing a shape of the inspection object 90.

Further, the screen 80 may include an information display area 85 that displays information (a file name and the like) relating to the first image data 10. The screen 80 may further include, for example, a shape information display area 84 that displays a detail of a shape of the inspection object 90 displayed in the display area 81. Specifically, when a shape of the inspection object 90 is the line 82 and the line 83 illustrated in FIG. 17, the screen 80 may display, in the shape information display area 84, for example, coordinate values or the like of a starting point and an end point on the image. In addition, the screen 80 may include, for example, a button 86 that accepts that the image displayed in the display area 81 has been checked by an operator.

For example, when a shape displayed in the display area 81 is not superimposed on an appropriate position of the inspection object 90 (i.e., when the first parameter is not appropriate), an operator may select and move the shape to an appropriate position by using a pointing device or the like. Further, an operator may correct a detail of a shape of an inspection object displayed in the shape information display area 84 by using an input device such as a keyboard.

Use of the screen 80 enables checking that the first parameter has been appropriately computed from the inspection object 90. Further, when the computed first parameter is incorrect, the computed first parameter can be corrected to a correct parameter. With this, a probability that the second image data 20 are generated correctly, that is, a probability that a view of the inspection object 90 is geometrically transformed correctly in such a way as to satisfy a predetermined reference can be increased. Thus, an abnormality of the inspection object 90 can be detected with higher accuracy.

When the inspection apparatus 100 includes the checking unit 170, the checking unit 170 operates before the second image data 20 are generated after the first parameter is computed by the transformation unit 120. In other words, the second image data 20 are generated after the above-described checking is performed by an operator or the like.

While the example embodiments of the present invention have been described with reference to the drawings, the above-described example embodiments are exemplified of the present invention, and a combination of the above-described example embodiments or various configurations other than the above may be employed.

The whole or part of the above-described example embodiments can be described as, but not limited to, the following supplementary notes.

1. An inspection apparatus including:
a transformation unit that detects an inspection object from first image data in which the inspection object is included, and generates second image data by performing a geometric transform on the first image data in such a way that a view of the detected inspection object becomes a view satisfying a predetermined reference; and
a detection unit that detects, by using an identification model for detecting an abnormality of the inspection object, an abnormality of the inspection object included in the second image data, wherein
the identification model is learned by using image data in which an inspection object having a view satisfying a predetermined reference is included.

2. An inspection apparatus including:
a transformation unit that detects an inspection object from first image data in which the inspection object is included, and generates second image data by performing a geometric transform on the first image data in such a way that a view of the detected inspection object becomes a view satisfying a predetermined reference; and
a learning unit that learns, by using the second image data, an identification model for detecting an abnormality of the inspection object.

3. The inspection apparatus according to supplementary note 1 or 2, wherein
the transformation unit
computes a first parameter representing a view of the inspection object on the first image data,
acquires a reference parameter representing the predetermined reference, and
determines, based on the first parameter and the reference parameter, a geometric transform to be applied to the first image data in such a way that a degree of divergence between a second parameter representing a view of the inspection object on the second image data and the reference parameter is reduced.

4. The inspection apparatus according to supplementary note 3, wherein
the first parameter includes any one of a position where a line representing the inspection object and any one edge of the first image data intersect each other, a size of an angle formed by a line representing the inspection object and any one edge of the first image data, a length of a normal line drawn from an origin to a line representing the inspection object, and an angle of the normal line.

5. The inspection apparatus according to any one of supplementary notes 1 to 4, wherein the transformation unit determines, by using teaching data in which an image area representing the inspection object on the first image data is specified, a geometric transform for generating the second image data from the first image data.

6. The inspection apparatus according to any one of supplementary notes 1 to 5, further including
a checking unit that outputs a display indicating an image area representing the inspection object detected from the first image data, and accepts an input for correcting an image area representing the inspection object.

7. The inspection apparatus according to any one of supplementary notes 1 to 6, further including
an output unit that determines an area on the first image data equivalent to an abnormal part of the inspection object detected from the second image data, and outputs the first image data in which a predetermined display is superimposed on the determined area.

8. A control method executed by a computer, including:
a transformation step of detecting an inspection object from first image data in which the inspection object is included, and generating second image data by performing a geometric transform on the first image data in such a way that a view of the detected inspection object becomes a view satisfying a predetermined reference; and
a detection step of detecting, by using an identification model for detecting an abnormality of the inspection object, an abnormality of the inspection object included in the second image data, wherein
the identification model is learned by using image data in which an inspection object having a view satisfying a predetermined reference is included.

9. A control method executed by a computer, including:
a transformation step of detecting an inspection object from first image data in which the inspection object is included, and generating second image data by performing a geometric transform on the first image data in such a way that a view of the detected inspection object becomes a view satisfying a predetermined reference; and
a learning step of learning, by using the second image data, an identification model for detecting an abnormality of the inspection object.

10. The control method according to supplementary note 8 or 9, further including:
in the transformation step,
computing a first parameter representing a view of the inspection object on the first image data;
acquiring a reference parameter representing the predetermined reference; and
determining, based on the first parameter and the reference parameter, a geometric transform to be applied to the first image data in such a way that a degree of divergence between a second parameter representing a view of the inspection object on the second image data and the reference parameter is reduced.

11. The control method according to supplementary note 10, wherein
the first parameter includes any one of a position where a line representing the inspection object and any one edge of the first image data intersect each other, a size of an angle formed by a line representing the inspection object and any one edge of the first image data, a length of a normal line drawn from an origin to a line representing the inspection object, and an angle of the normal line.

12. The control method according to any one of supplementary notes 8 to 11, further including,
in the transformation step, determining, by using teaching data in which an image area representing the inspection object on the first image data is specified, a geometric transform for generating the second image data from the first image data.

13. The control method according to any one of supplementary notes 8 to 12, further including
a checking step of outputting a display indicating an image area representing the inspection object detected from the first image data, and accepting an input for correcting an image area representing the inspection object.

14. The control method according to any one of supplementary notes 8 to 13, further including
an output step of determining an area on the first image data equivalent to an abnormal part of the inspection object detected from the second image data, and outputting the first image data in which a predetermined display is superimposed on the determined area.

15. A program causing a computer to execute each of steps in the control method according to any one of supplementary notes 8 to 14.

What is claimed is:

1. An inspection apparatus comprising:
a memory storing instructions; and
a processor configured to execute the instructions to:
detect an inspection object from first image data in which the inspection object is included;
generate second image data by performing a geometric transform on the first image data in such a way that a view of the detected inspection object satisfies a predetermined reference; and
detect, by using an identification model, an abnormality of the inspection object included in the second image data, wherein
the identification model is learned by using image data in which learning inspection objects having views satisfying the predetermined reference are included, and
in the geometric transform, a degree of divergence between a second parameter representing a second view of the inspection object on the second image data and the reference becomes smaller than a degree of divergence between a first parameter representing a first view of the inspection object on the first image data and the reference.

2. The inspection apparatus according to claim 1, wherein the second image data is generated by
computing the first parameter representing the first view of the inspection object on the first image data;
acquiring a reference parameter representing the predetermined reference; and
determining, based on the first parameter and the reference parameter, the geometric transform to apply to the first image data in such a way that the degree of divergence between the second parameter representing the second view of the inspection object on the second image data and the reference parameter is reduced.

3. The inspection apparatus according to claim 2, wherein the first parameter includes any one of a position where a line representing the inspection object and any one edge of the first image data intersect each other, a size of an angle formed by the line representing the inspection object and the any one edge of the first image data, a length of a normal line drawn from an origin to the line representing the inspection object, and an angle of the normal line.

4. The inspection apparatus according to claim 1, wherein the inspection object is detected from the first image data by using teaching data in which an image area representing the inspection object on the first image data is specified.

5. The inspection apparatus according to claim 1, wherein the processor is configured to execute the instructions to further:
display an image area representing the inspection object detected from the first image data; and
accept an input for correcting the image area representing the inspection object.

6. The inspection apparatus according to claim 1, wherein the processor is configured to execute the instructions to further:
determine an area on the first image data equivalent to an abnormal part of the inspection object detected from the second image data and
display a predetermined display superimposed on the determined area.

7. The inspection apparatus according to claim 1, wherein the geometric transform uses the second parameter as the reference.

8. An inspection apparatus comprising:
a memory configured to store instructions; and
a processor configured to execute the instructions including:
detect an inspection object from first image data in which the inspection object is included;
generate second image data by performing a geometric transform on the first image data in such a way that a view of the detected inspection object satisfies a predetermined reference; and
learn, by using the second image data, an identification model for detecting an abnormality of the inspection object, wherein
in the geometric transform, a degree of divergence between a second parameter representing a second view of the inspection object on the second image data and the reference becomes smaller than a degree of divergence between a first parameter representing a first view of the inspection object on the first image data and the reference.

9. The inspection apparatus according to claim 8, wherein the second image data is generated by
computing the first parameter representing the first view of the inspection object on the first image data;
acquiring a reference parameter representing the predetermined reference; and
determining, based on the first parameter and the reference parameter, the geometric transform to be applied to apply to the first image data in such a way that the degree of divergence between the second parameter representing the second view of the inspection object on the second image data and the reference parameter is reduced.

10. The inspection apparatus according to claim 9, wherein
the first parameter includes any one of a position where a line representing the inspection object and any one edge of the first image data intersect each other, a size of an angle formed by the line representing the inspection object and the any one edge of the first image data, a length of a normal line drawn from an origin to the line representing the inspection object, and an angle of the normal line.

11. The inspection apparatus according to claim 8, wherein
the inspection object is detected from the first image data by using teaching data in which an image area representing the inspection object on the first image data is specified.

12. The inspection apparatus according to claim 8, wherein the processor is configured to execute the instructions to further:
display indicating an image area representing the inspection object detected from the first image data; and
accept an input for correcting the image area representing the inspection object.

13. The inspection apparatus according to claim 8, wherein the processor is configured to execute the instructions to further:
determine an area on the first image data equivalent to an abnormal part of the inspection object detected from the second image data and
display a predetermined display superimposed on the determined area.

14. A control method comprising:
detecting, by a processor, an inspection object from first image data in which the inspection object is included;
generating, by the processor, second image data by performing a geometric transform on the first image data in such a way that a view of the detected inspection object satisfies a predetermined reference; and
detecting, by the processor using an identification model, an abnormality of the inspection object included in the second image data, wherein
the identification model is learned by using image data in which learning inspection objects having views satisfying the predetermined reference are included, and
in the geometric transform, a degree of divergence between a second parameter representing a second view of the inspection object on the second image data and the reference becomes smaller than a degree of divergence between a first parameter representing a first view of the inspection object on the first image data and the reference.

15. The control method according to claim 14, wherein further comprising:
generating the second image data comprises:
computing the first parameter representing the first view of the inspection object on the first image data;
acquiring a reference parameter representing the predetermined reference; and
determining, based on the first parameter and the reference parameter, the geometric transform to apply to the first image data in such a way that the degree of divergence between the second parameter representing the second view of the inspection object on the second image data and the reference parameter is reduced.

16. The control method according to claim 15, wherein
the first parameter includes any one of a position where a line representing the inspection object and any one edge of the first image data intersect each other, a size of an angle formed by the line representing the inspection object and the any one edge of the first image data, a length of a normal line drawn from an origin to the line representing the inspection object, and an angle of the normal line.

17. The control method according to claim 14, wherein the inspection object is detected from the first image data by using teaching data in which an image area representing the inspection object on the first image data is specified.

18. The control method according to claim 14, further comprising:
    displaying, by the processor, an image area representing the inspection object detected from the first image data; and
    accepting, by the processor, an input for correcting the image area representing the inspection object.

19. The control method according to claim 14, further comprising:
    determining, by the processor, an area on the first image data equivalent to an abnormal part of the inspection object detected from the second image data; and
    displaying, by the processor, a predetermined display superimposed on the determined area.

20. A non-transitory computer readable medium storing a program executable by a computer to perform the control method according to claim 14.

* * * * *